(12) United States Patent
Watanabe

(10) Patent No.: US 7,400,829 B2
(45) Date of Patent: Jul. 15, 2008

(54) TRANSMISSION APPARATUS AND PATH SELECTION METHOD OF A TRANSMISSION APPARATUS

(75) Inventor: Kenji Watanabe, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 309 days.

(21) Appl. No.: 11/037,073

(22) Filed: Jan. 19, 2005

(65) Prior Publication Data

US 2005/0123297 A1 Jun. 9, 2005

Related U.S. Application Data

(63) Continuation of application No. PCT/JP02/12036, filed on Nov. 19, 2002.

(51) Int. Cl.
*G02F 1/00* (2006.01)
(52) U.S. Cl. ............ 398/5; 398/79; 398/1; 398/2; 398/3; 398/4; 398/7; 398/10; 398/13; 398/14; 398/17; 398/20; 398/22; 398/23; 398/24; 398/25; 398/26; 398/27; 398/30; 398/31; 398/33; 398/34; 398/38; 398/45; 398/48; 398/141; 398/145; 398/153; 398/158; 398/162; 398/182; 398/192; 398/202; 398/208; 398/209; 398/213; 398/214; 385/24; 385/11; 385/7; 385/15; 385/37

(58) Field of Classification Search ............ 398/79, 398/5, 6, 7, 13, 10, 14, 17, 20, 26, 27, 25, 398/30, 31, 33, 34, 45, 48, 1, 2, 3, 4, 15, 398/22, 23, 24, 38, 141, 145, 153, 158, 162, 398/182, 192, 202, 208, 209, 213, 214; 385/24, 385/11, 15, 7, 39, 37
See application file for complete search history.

(56) References Cited

U.S. PATENT DOCUMENTS

| | | | | |
|---|---|---|---|---|
| 5,002,349 A | * | 3/1991 | Cheung et al. | 385/1 |
| 6,081,359 A | * | 6/2000 | Takehana et al. | 398/1 |
| 6,211,980 B1 | * | 4/2001 | Terahara | 398/82 |
| 6,944,362 B2 | * | 9/2005 | Jasti | 385/16 |
| 2001/0046074 A1 | * | 11/2001 | Kakizaki et al. | 359/110 |

FOREIGN PATENT DOCUMENTS

JP 62-168436 7/1987

(Continued)

*Primary Examiner*—Hanh Phan
(74) *Attorney, Agent, or Firm*—Staas & Halsey LLP

(57) ABSTRACT

A transmission apparatus that receives an optical signal by selecting any one of a plurality of provided optical signal transmission paths through protection control is configured to include a plurality of optical signal outputting sections that output the optical signals transmitted through said optical signal transmission paths respectively as optical signals having wavelengths that are different from each other, a wavelength selective optical switch capable of selectively outputting light of a wavelength corresponding to any one of the optical signals coming from the optical signal outputting sections on the basis of the frequency of a controlling frequency signal, and an optical switch controlling section that supplies said controlling frequency signal to the wavelength selective optical switch so as to output the optical signal coming from the optical signal transmission path side that is selected by said protection control among the optical signals coming from the optical signal outputting sections.

13 Claims, 7 Drawing Sheets

FOREIGN PATENT DOCUMENTS

| | | |
|---|---|---|
| JP | 2-276327 | 11/1990 |
| JP | 5-219002 | 8/1993 |
| JP | 8-79171 | 3/1996 |
| JP | 8-125636 | 5/1996 |
| JP | 11-298928 | 10/1999 |
| JP | 11-331043 | 11/1999 |

* cited by examiner

TRANSMISSION APPARATUS AND PATH SELECTION METHOD OF A TRANSMISSION APPARATUS

This application is a continuation application, filed under 35 USC 111(a), of International Application PCT/JP2002/012036. filed Nov. 19, 2002.

BACKGROUND OF THE INVENTION

1. Field of the Inventions

The present invention relates to a transmission apparatus that receives an optical signal by selecting any one of a plurality of provided optical signal transmission paths through protection control, and to a transmission apparatus and a path selection method of a transmission apparatus that are suitable when used, for example, in performing protection control in a WDM (Wavelength Division Multiplexing) apparatus.

2. Description of the Related Art

FIG. 4 is a view for describing the first mode of protection control in a conventional WDM transmission. In FIG. 4, numerals 100 and 200 represent a WDM transmitting apparatus and a WDM receiving apparatus, respectively. Also, two paths 301, 302 for protection control are provided in the optical transmission direction from the WDM transmitting apparatus 100 towards the WDM receiving apparatus 200, thereby enhancing the anti-obstruction property of optical communication between the WDM transmitting apparatus 100 and WDM receiving apparatus 200. Here, paths 301, 302 are constituted, for example, of optical fibers, relay amplifiers, and the like.

Namely, the WDM transmitting apparatus 100 includes n transmitting-side protection processing sections 130-1 to 130-n (in FIG. 4, illustration is made by keeping an eye on 130-1) provided in correspondence with the number of wavelengths capable of being transmitted by wavelength multiplexing [for example, n frequencies of f1 to fn (n; integer of 2 or more)], and wavelength multiplexing sections 141, 142 that perform wavelength multiplexing in correspondence with the paths 301, 302 for transmission with respect to optical signals of wavelengths f1 to fn from the respective transmitting-side protection processing sections 130-1 to 130-n. Here, in the following, with respect to the configuration of the transmitting-side protection processing sections 130-1 to 130-n, description will be given by keeping an eye on the transmitting-side protection processing section 130-1.

Here, the transmitting-side protection processing section 130-1 includes an optical coupler 131 that divides the optical transmission signals before wavelength multiplexing into two branches, and signal processing sections 132, 133 that perform signal processing on the respective optical transmission signals divided into two branches by the optical coupler. 131. The optical signal from the signal processing section 132 is outputted to the wavelength multiplexing section 141, and the signal from the signal processing section 133 is outputted to the wavelength multiplexing section 142.

This allows that the optical signals subjected to wavelength multiplexing in the wavelength multiplexing sections 141, 142 are outputted to a receiving section 220 of the WDM transmission apparatus 200 through the paths 301, 302 made of optical fibers, relay amplifiers, and the like. Here, in the signal processing sections 132, 133, numerals 132A, 133A are O/E (Optic/Electric) converting sections, and numerals 132B, 133B are NB·E/O (Electric/Optic) converting sections.

Also, the WDM receiving apparatus 200 includes wavelength separating sections 231, 232 that perform wavelength separation on the optical signals from the WDM transmission apparatus 100 that have been transmitted respectively through the paths 301, 302 into optical signals of wavelengths f1 to fn, and n receiving-side protection processing sections 240-1 to 240-n that perform receiving-side protection processing on the optical signals of respective wavelengths f1 to fn that have been separated in the wavelength separating sections 231, 232. Here, in the following, with respect to the configuration of the receiving-side protection processing sections 240-1 to 240-n, description will be given by keeping an eye on the receiving-side protection processing section 240-1.

Here, the receiving-side protection processing section 240-1 is configured to include signal processing sections 241, 242 that perform signal processing respectively on the optical signals of the same wavelength that have been subjected to wavelength separation in the wavelength separating sections 231, 232, an optical switch 244 that selectively outputs either one of the optical signals from the signal processing sections 241, 242 as an active optical signal, and an optical switch controlling section 243 that controls the optical switch 244.

Further, the signal processing sections 241, 242 respectively include O/E converting sections 241A, 242A that convert the optical signals from the wavelength separating sections 231, 232 into electric signals and extract supervision control information needed for protection control, and E/O converting sections 241B, 242B that convert the electric signals from the O/E converting sections 241A, 242A into optical signals having the same wavelength with each other.

Namely, on the basis of the supervision control information that is input from the O/E converting sections 241A, 242A of the signal processing sections 241, 242, the optical switch controlling section 243 is adapted to the control optical switch 244 so as to select either one of the optical signal that has been transmitted through the path 301 (See A-path 310 in the Figure) and the optical signal that has been transmitted through the path 302 (See B-path 320 in the Figure), as an active optical signal.

Further, as illustrated in FIG. 5(a) and FIG. 5(b) in detail, the optical switch 244 includes a coil 244A and a prism 244B that can move so as to assume a position such as shown in FIG. 5(a) or FIG. 5(b) in accordance with the direction of a magnetic field by the coil 244A.

Namely, by a pulse signal from the optical switch controlling section 243, when the magnetic field inside the coil 244A is in a state of U direction shown in FIG. 5(a), a signal from the path 301 is outputted, while when the magnetic field inside the coil 244A is in a state of D direction shown in FIG. 5(b), a signal from the path 302 is outputted. Here, in the optical switch controlling section 243, the switching state of the optical switch 244 is retained by outputting only one pulse signal. Therefore, electric current is not let to flow through the coil 244A after the switching operation of the optical switch 244.

According to such a configuration, either one of the optical signals transmitted redundantly through the A-path 310 and the B-path 320 in the WDM transmitting apparatus 100 shown in FIG. 4 is selectively outputted by the switching control of the optical switch 244 by the optical switch controlling section 243.

Further, the optical switch controlling section 243 receives alarming information (for example, optical input cut-off, line errors, and the like) of the A-path and the B-path 320 as supervision control information that is detected respectively in the O/E converting sections 241A, 242A of the signal processing sections 241, 242 and, when it is determined that abnormality has occurred in a receiving path, switches the path to be selected by outputting a pulse signal to the optical switch 244.

Further, FIG. 6 is a view for describing the second mode of protection control in a conventional WDM transmission. In this FIG. 6, numeral 100 represents a WDM transmitting apparatus similar to the above-described one of FIG. 4, and numeral 200' represents a WDM receiving apparatus having a different method of switching control of the paths 301, 302 compared with the above-described WDM receiving apparatus 200. Also, in a manner similar to the above-described case of FIG. 4, two paths 301, 302 for protection control are provided in the optical transmission direction from the WDM transmitting apparatus 100 towards the WDM receiving apparatus 200'.

Here, the WDM receiving apparatus 200' includes the wavelength separating sections 231, 232 similar to those shown in FIG. 4 and n receiving-side protection processing sections 240'-1 to 240'-n that perform protection control that is different from the one shown in FIG. 4 (See reference numbers 240-1 to 240-n). Here, in the following, with respect to the configuration of the receiving-side protection processing sections 240'-1 to 240'-n, description will be given by keeping an eye on the receiving-side protection processing section 240'-1.

Here, the receiving-side protection processing section 240'-1 is configured to include signal processing sections 241', 242, an optical switch controlling section 243', and an optical coupler 244'.

Further, the signal processing sections 241', 242' respectively include the O/E converting sections 241A, 242A that convert the optical signals from the wavelength separating sections 231, 232 into electric signals and extract supervision control information needed for protection control to supply to the optical switch controlling section 243, and the E/O converting sections 241B, 242B that convert the electric signals from the O/E converting sections 241A, 242A into optical signals by receiving ON/OFF control of light from the optical switch controlling section 243.

FIG. 7 is a view illustrating a construction of an essential part of the above-described E/O converting sections 241B, 242B. As illustrated in this FIG. 7, the E/O converting sections 241B, 242B respectively include LD (Laser Diode) 245A, 245B, driving sections 247A, 247B that drive the LD 245 by electric signals from the O/E converting sections 241A, 241B using power source 246 as a voltage supplying source, and switches 248A, 248B that control supply/non-supply of a voltage signal supplied from the power source by a controlling signal from the optical switch controlling section 243.

Namely, the switches 248A, 248B are controlled by the controlling signal from the optical switch controlling section 243 to supply the electric signal from the power source 246 to the LD 245A, 245B for the E/O converting section 241B, 242B on the selected path side (active state), and not to supply the electric signal from the power source 246 to the LD 245A, 245B for the E/O converting section 241B, 242B on the non-selected path side (non-active state).

This allows that the optical switch controlling section 243 can control the E/O converting sections 241B, 242B so as to select either one of the optical signal transmitted through the path 301 (A-path 310 in the Figure) and the optical signal transmitted through the path 302 (B-path 320 in the Figure) as an active optical signal on the basis of the supervision control information inputted from the O/E converting sections 241A, 242A of the signal processing sections 241, 242.

With such a configuration, either one of the optical signals that have been transmitted redundantly through the A-path or the B-path in the WDM transmitting apparatus 100 shown in FIG. 6 is selectively outputted by switching control of active state/non-active state of the E/O converting sections 241B, 242B by the optical switch controlling section 243.

However, in the above-described apparatus 200 for protection control shown in FIG. 4, the active path is selected by the pulse signal supplied to the optical switch 244, so that the electric current does not flow through the coil after the switching operation of the optical switch 244, making it impossible to confirm in which direction the optical switch is operating correctly after the switching operation. Namely, there is a problem in that one cannot confirm which of the A-path and the B-path is selected.

Further, in the apparatus 200' for protection control shown in FIG. 6, the active path is selected by active/non-active of the LD 245A, 245B in the E/O converting sections 241B', 242B'. For example, when the LD 245A, 245B of the E/O converting section 241B', 242B' in the standby path is out of order, these LD 245A, 245B cannot be activated even if a controlling signal for activating the LD 245A, 245B of the E/O converting section 241B', 242B' in the standby path is outputted in the optical switch controlling section 243', thereby raising a problem. In other words, in the protection mode of FIG. 6, since the standby system is in a non-active state, the normality of the standby system cannot be supervised.

Meanwhile, as a known art related to the invention of the present application, there is one disclosed in Japanese Patent Application Laid-Open HEI8-125636. In order to realize a protection method which is rapid and certain in wavelength multiplexing transmission, a transmission apparatus disclosed in this Japanese Patent Application Laid-Open HEI8-125636 is provided with means for detecting an obstacle for the signal of each wavelength and means for switching the signals transmitted by being subjected to wavelength multiplexing through one active transmission path simultaneously to a standby transmission path.

However, in the transmission apparatus disclosed in this Japanese Patent Application Laid-Open HEI8-125636, the above-described means for switching to the standby transmission path is constituted of a selector or a spatial switch controlled by a controlling circuit. However, no specific disclosure is given on the construction of the selector, so that when it is constructed as shown in the above-described FIG. 5(a) or FIG. 5(b), it seems to be difficult to monitor the path selection direction at all times.

The present invention has been devised in view of such a problem, and an object thereof is to provide a transmission apparatus and a path selection method of a transmission apparatus that can always monitor the path selection direction by an optical switch and also can always supervise the normality of a standby system which is a non-selected optical path.

SUMMARY OF THE INVENTION

In order to achieve the aforementioned object, the transmission apparatus of the present invention is a transmission apparatus that receives an optical signal by selecting any one of a plurality of provided optical signal transmission paths through protection control, comprising: a plurality of optical signal outputting sections that output the optical signals transmitted through said plurality of optical signal transmission paths respectively as optical signals having wavelengths that are different from each other; a wavelength selective optical switch capable of selectively outputting light of a wavelength corresponding to any one of the optical signals coming from the plurality of optical signal outputting sections on the basis of the frequency of a controlling frequency signal; and an optical switch controlling section that supplies said controlling frequency signal to the wavelength selective optical switch so as to output the optical signal coming from the optical signal transmission path side that is selected by said protection control among the optical signals coming from the optical signal outputting sections.

Also, the transmission apparatus of the present invention is a transmission apparatus that receives an optical signal by selecting any one of a plurality of provided optical signal transmission paths through protection control, comprising: a plurality of optical signal outputting sections that output the optical signals transmitted through said plurality of optical signal transmission paths respectively as optical signals having wavelengths that are different from each other; a wavelength selective optical switch capable of selectively outputting light of a wavelength corresponding to any one of the optical signals coming from the plurality of optical signal outputting sections on the basis of the frequency of a controlling frequency signal; an optical switch controlling section that supplies said controlling frequency signal to the wavelength selective optical switch so as to output the optical signal coming from the optical signal transmission path side that is selected by said protection control among the optical signals coming from the optical signal outputting sections; and a frequency detecting section that detects the frequency of said controlling frequency signal.

Further, the transmission apparatus of the present invention is a transmission apparatus that receives an optical signal by selecting any one of a plurality of provided optical signal transmission paths through protection control, comprising: a plurality of optical signal outputting sections that output the optical signals transmitted through said plurality of optical signal transmission paths respectively as optical signals having wavelengths that are different from each other; a wavelength selective optical switch capable of selectively outputting light of a wavelength corresponding to any one of the optical signals coming from the plurality of optical signal outputting sections on the basis of the frequency of a controlling frequency signal; an optical switch controlling section that supplies said controlling frequency signal to the wavelength selective optical switch so as to output the optical signal coming from the optical signal transmission path side that is selected by said protection control among the optical signals coming from the optical signal outputting sections; and a monitoring section that monitors the respective optical signals created in the optical signal creating sections.

Also, the transmission apparatus of the present invention is a transmission apparatus that receives an optical signal by selecting any one of a plurality of provided optical signal transmission paths through protection control, comprising: a plurality of optical signal outputting sections that output the optical signals transmitted through said plurality of optical signal transmission paths respectively as optical signals having wavelengths that are different from each other; a wavelength selective optical switch capable of selectively outputting light of a wavelength corresponding to any one of the optical signals coming from the plurality of optical signal outputting sections on the basis of the frequency of a controlling frequency signal; an optical switch controlling section that supplies said controlling frequency signal to the wavelength selective optical switch so as to output the optical signal coming from the optical signal transmission path side that is selected by said protection control among the optical signals coming from the optical signal outputting sections; a frequency detecting section that detects the frequency of said controlling frequency signal; and a monitoring section that monitors the respective optical signals created in the optical signal creating sections.

In the above-described transmission apparatus, the frequency detecting section may be configured to include band pass filters capable of respectively detecting controlling frequency signals corresponding to the selectively output table optical signals.

More preferably, each of the optical signal creating sections may include a light-emitting element capable of emitting light of a wavelength that is different from each other, a light-emitting element driving section that drives the light-emitting element so as to create said optical signal, and a light-receiving element that receives back light of the light-emitting element, and the monitoring section may be configured as a cut-off state detecting circuit that detects a cut-off state of each optical signal creating section on the basis of the received light signal coming from the light-receiving element of each optical signal creating section.

Also, the optical switch controlling section can be configured to supply said controlling frequency signal to the wavelength selective optical switch by the protection control based on the respective optical signals that have been transmitted through the plurality of optical signal transmission paths.

More preferably, the wavelength selective optical switch can be constituted of an acousto-optical wavelength filter.

Also, the path selection method of a transmission apparatus of the present invention is a path selection method of a transmission apparatus in which a plurality of optical signal transmission paths are provided between a first transmission apparatus and a second transmission apparatus, and any one of said plurality of optical signal transmission paths is selected by protection control in the second transmission apparatus, comprises: a step of receiving in the second transmission apparatus an input of optical signals that have been transmitted redundantly with the same wavelength through the plurality of optical signal transmission paths from said first transmission apparatus and outputting them as optical signals of wavelengths that are different from each other to a wavelength selective optical switch; and a step of receiving an optical signal outputted from the wavelength selective optical switch as an optical signal from the selected path by controlling the wavelength selective optical switch with a controlling frequency signal for outputting the optical signal transmitted through the optical signal transmission path that is selected by said protection control.

Thus, the present invention provides an advantage in that the path selection direction by a wavelength selective optical switch can be monitored at all times and also the normality of a standby system which is a non-selected optical path can be supervised at all times.

DESCRIPTION OF THE PREFERRED EMBODIMENT(S)

(a) Description of One Embodiment of the Present Invention

Hereafter, an embodiment of the present invention will be described with reference to the drawings.

Figure 1:
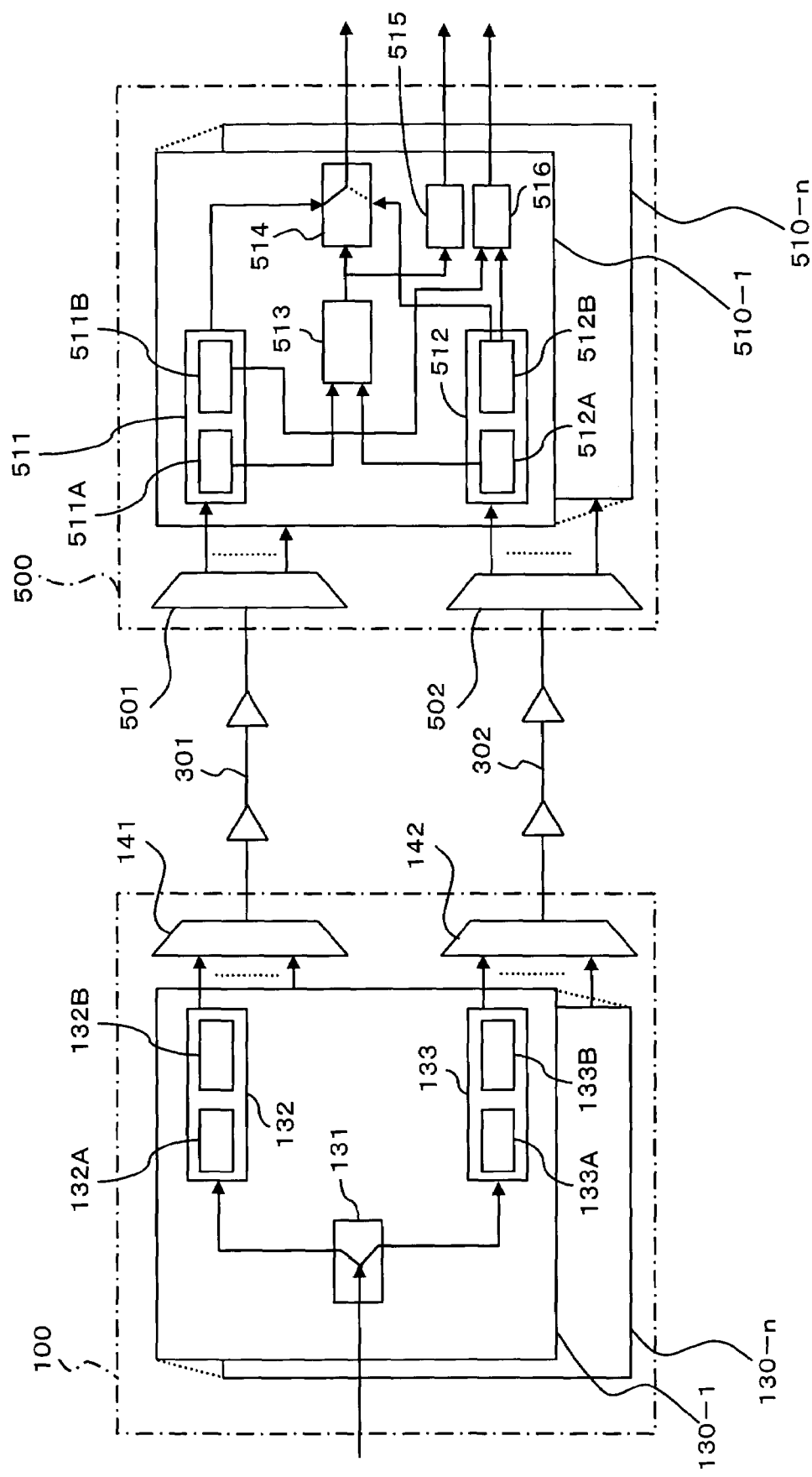
FIG. 1 is a block diagram illustrating an embodiment of the present invention.
Figure 6:
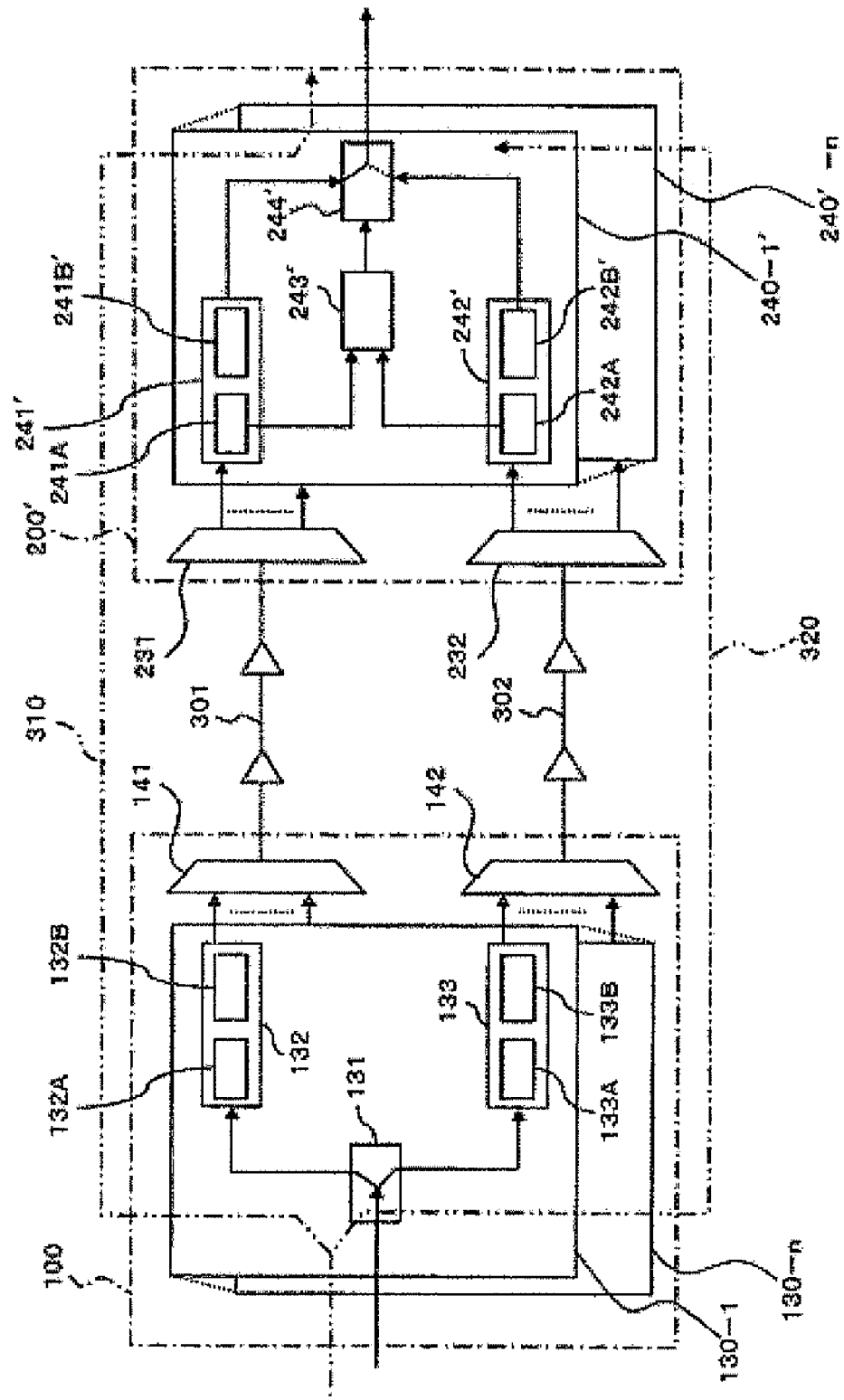
FIG. 6 is a view for describing the second mode of protection control in a conventional WDM transmission.
Figure 7:
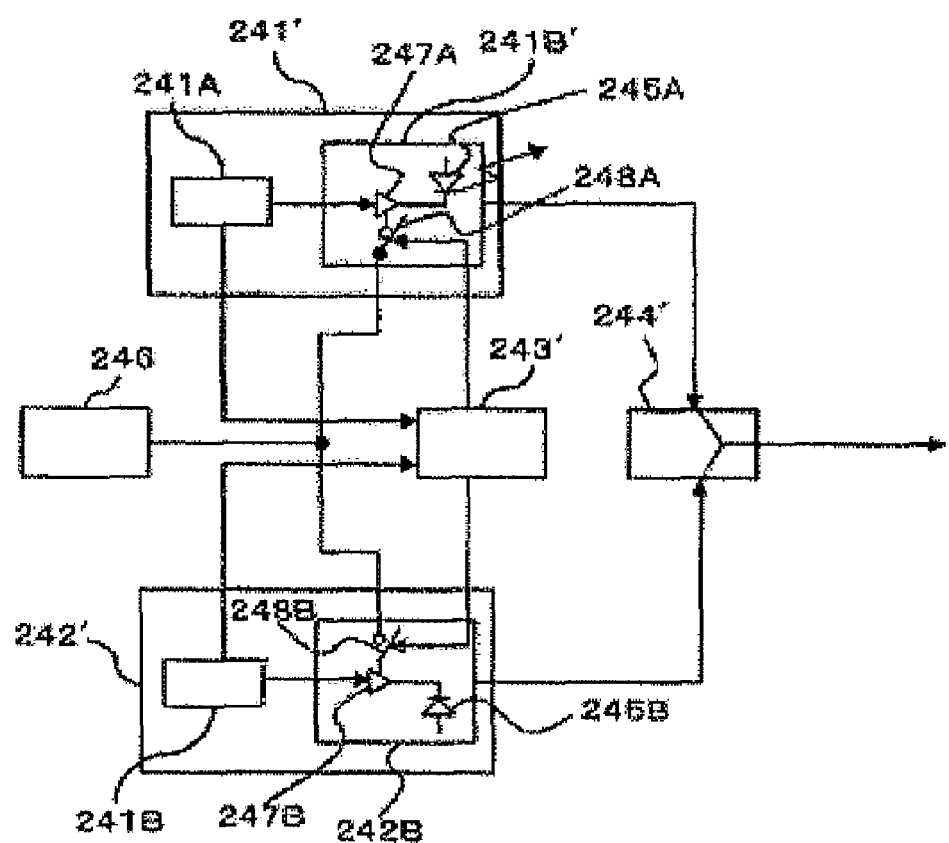
FIG. 7 is a view illustrating an essential part of a WDM receiving apparatus shown in FIG. 6.

FIG. 1 is a block diagram illustrating an embodiment of the present invention. In FIG. 1, numeral 100 represents a WDM transmitting apparatus (first transmission apparatus) similar to the above-described case of FIG. 4, and numeral 500 is a WDM receiving apparatus (second transmission apparatus) as a transmission apparatus having a configuration for switching control of paths 301, 302 characteristic to the invention of the present application compared with the above-described WDM receiving apparatus 200, 200' shown in FIG. 4 and FIG. 6.

Figure 4:
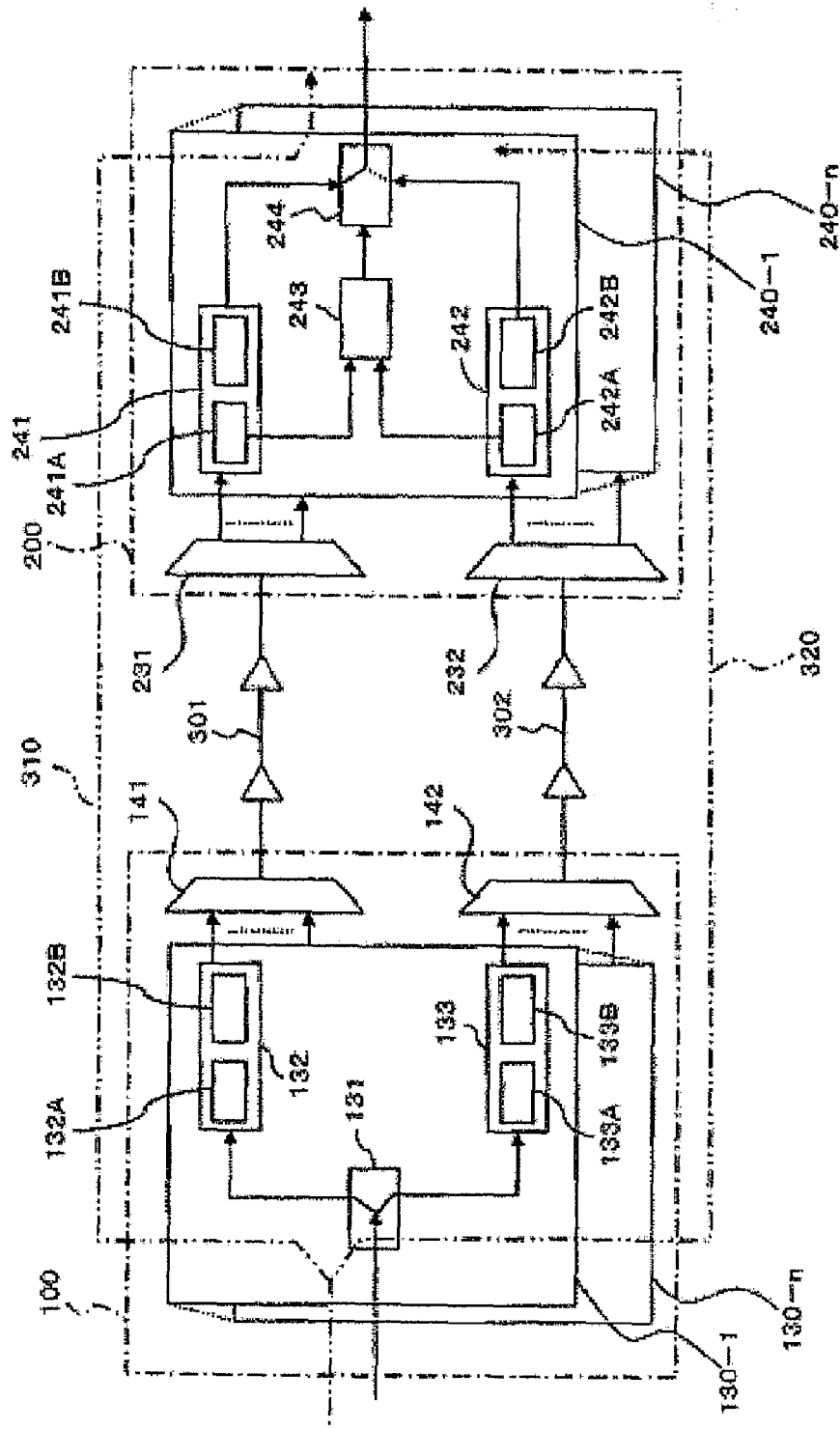
FIG. 4 is a view for describing the first mode of protection control in a conventional WDM transmission.
Figure 5A:
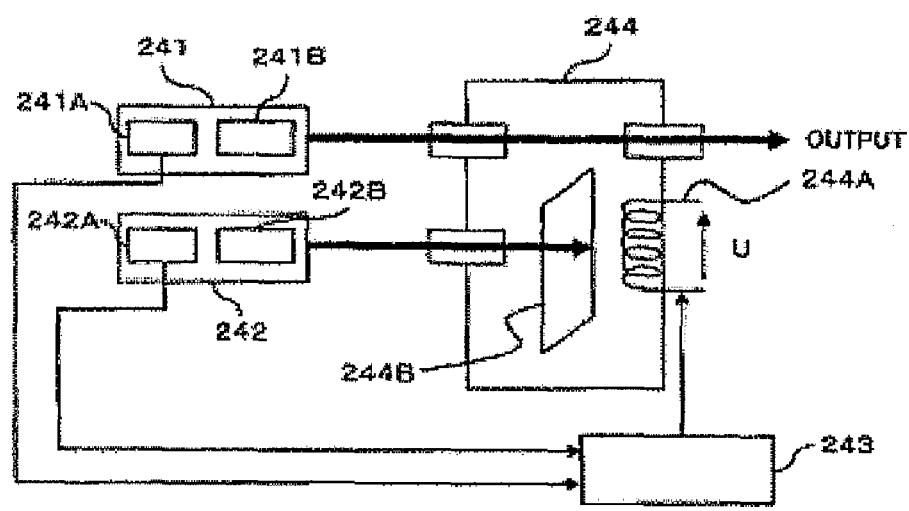
FIG. 5(a) and FIG. 5(b) both are views illustrating an essential part of a WDM receiving apparatus shown in FIG. 4.
Figure 5B:
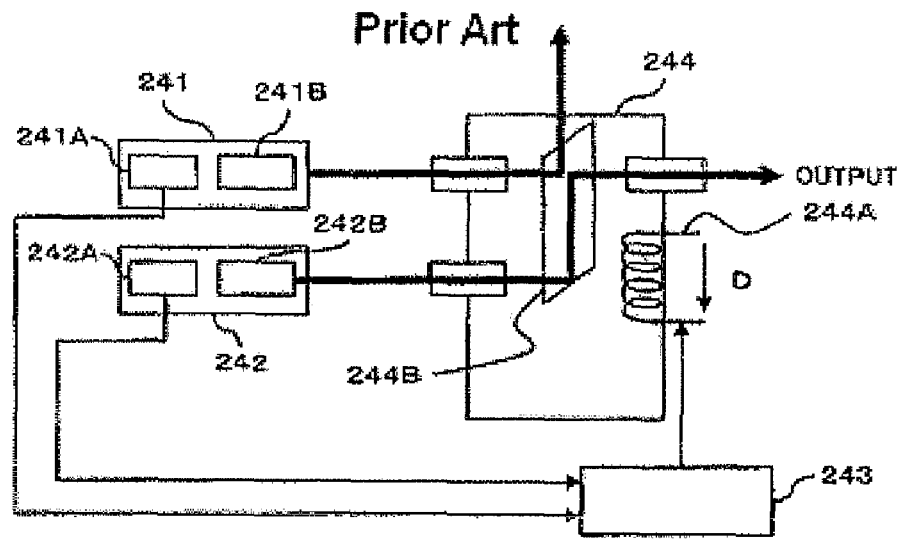

Also, in this FIG. 1, in a manner similar to the above-described case of FIG. 4, a plurality of (for example, two) paths (optical signal transmission paths) 301, 302 for protection control are provided in the optical transmission direction from the WDM transmitting apparatus 100 towards the WDM receiving apparatus 500.

Here, the WDM receiving apparatus 500 includes wavelength separating sections 501, 502 similar to those shown in FIG. 4 (See reference numbers 231, 232) and n receiving-side protection processing sections 510-1 to 510-n that perform protection control that is different from the one shown in FIG. 4 (See reference number 240). Here, in the following, with respect to the configuration of the receiving-side protection processing sections 510-1 to 510-n, description will be given by keeping an eye on the receiving-side protection processing section 510-1.

Here, the receiving-side protection processing section 510-1 is configured to include signal processing sections 511, 512 that perform signal processing respectively on the optical signals of the same wavelength f1 among the optical signals that have been subjected to wavelength separation into wavelengths f1 to fn in the wavelength separating sections 501, 502, an optical switch controlling section 513, a wavelength selective optical switch 514, a frequency detecting section 515, and a cut-off state detecting circuit 516.

Further, the signal processing sections 511, 512 respectively include O/E converting sections 511A, 512A that convert the optical signals from the wavelength separating sections 501, 502 into electric signals and extract supervision control information needed for protection control, and E/O converting sections 511B, 512B that convert the electric signals from the O/E converting sections 511A, 512A into optical signals having wavelengths λa, λb that are different from each other.

Figure 2:
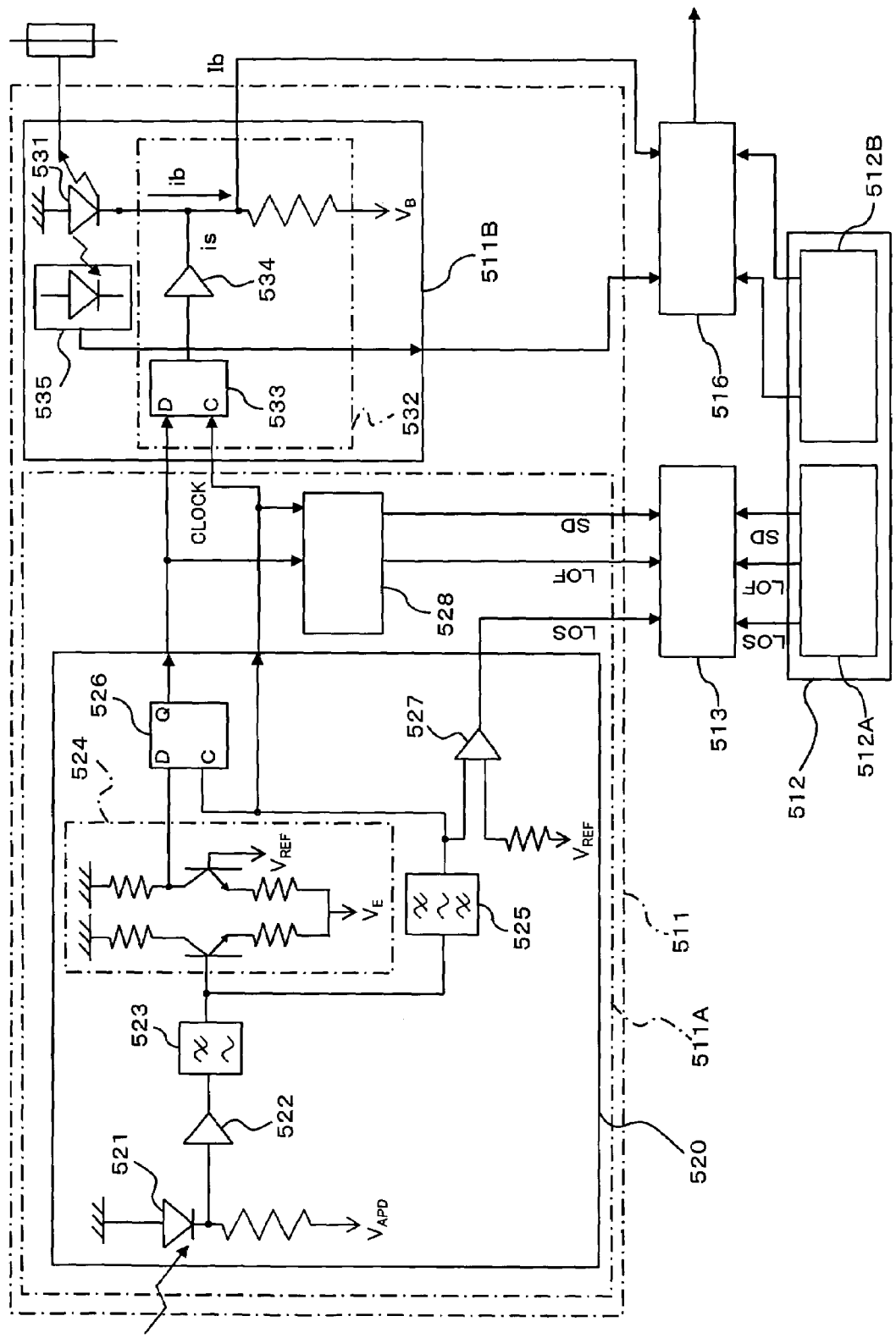
FIG. 2 is a block diagram illustrating an essential part of a transmission apparatus in the present embodiment.

The signal processing sections 511, 512 both have the same configuration; however, focus on the configuration of the signal processing section 511, the signal processing section 511 is configured to include the O/E converting section 511A and the E/O converting section 511B having a circuit configuration such as shown in FIG. 2 in detail.

Here, the O/E converting section 511A is configured to include a converting circuit section 520 that converts the optical signal subjected to wavelength separation in the wavelength separating section 501 into a digital electric signal, and an overhead monitor 528 that extracts overhead information of a multiplexed frame such as a SONET (Synchronous Optical Network) frame from the digital electric signal coming from the converting circuit section 520 to output an LOF (Loss Of From) signal and an SD (Signal Denude) signal.

Also, in the converting circuit section 520, numeral 521 represents a light-receiving element (APD; Avalanche Photo Diode) that receives an optical signal from the wavelength separating section 501 to convert it into an analog electric signal; numeral 522 represents an amplifier; numeral 523 represents a lowpass filter; numeral 524 represents a differential amplifier; numeral 525 represents a bandpass filter; numeral 526 represents a D flip-flop that outputs a signal component contained in the received optical signal as a digital electric signal; and numeral 527 represents an amplifier that outputs a signal (LOS; Loss Of Signal) indicating the loss of the signal component.

Here, the above-described LOF signal and SD signal from the overhead monitor 528 and the LOS signal outputted from the amplifier 527 are adapted to be outputted as supervision control information to the later-described optical switch controlling section 513.

Also, the E/O converting section 511B together with the above-described E/O converting section 512B functions as an optical signal creating section that outputs the optical signal that has been transmitted through the plurality of optical signal transmission paths 301, 302 as an optical signal having a wavelength λa (wavelength λb in the E/O converting section 512B) that is different from each other, and includes an LD 531, a driving circuit section 532, and a light-receiving element 535 as illustrated in FIG. 2.

Here, the LD 531 serving as a light-emitting element is capable of emitting light having a wavelength λa; and the LD driving circuit 532 drives the LD 531 so as to output the optical signal that has been transmitted through the above-described path 301 as an optical signal of wavelength λa, and includes a D flip-flop 533 and an amplifier 534.

Also, the light-receiving element 535 receives back light from the LD 531 and outputs an electric signal corresponding to the received light level, and can be constituted of a PD (Photo Diode). Here, the electric signal ($I_B$) supplied from the LD driving circuit section 532 in order to drive the LD 531 and the received light signal from the light-receiving element 535 are adapted to be outputted to the later-described monitor section 516.

Also, the wavelength selective optical switch 514 can selectively output light of a wavelength (λa or λb) corresponding to any one of the optical signals from the signal processing sections 511, 512 serving as a plurality of optical signal outputting sections on the basis of the frequency of the controlling frequency signal from the optical switch controlling section 513.

Further, the optical switch controlling section 513 supplies the controlling frequency signal to the wavelength selective optical switch 514 so as to output the optical signal coming from the optical signal transmission path side (for example, the signal processing section 511 on the path 301 side) that is selected by protection control among the optical signals of wavelengths λa, λb from the signal processing sections 511, 512.

Figure 3:
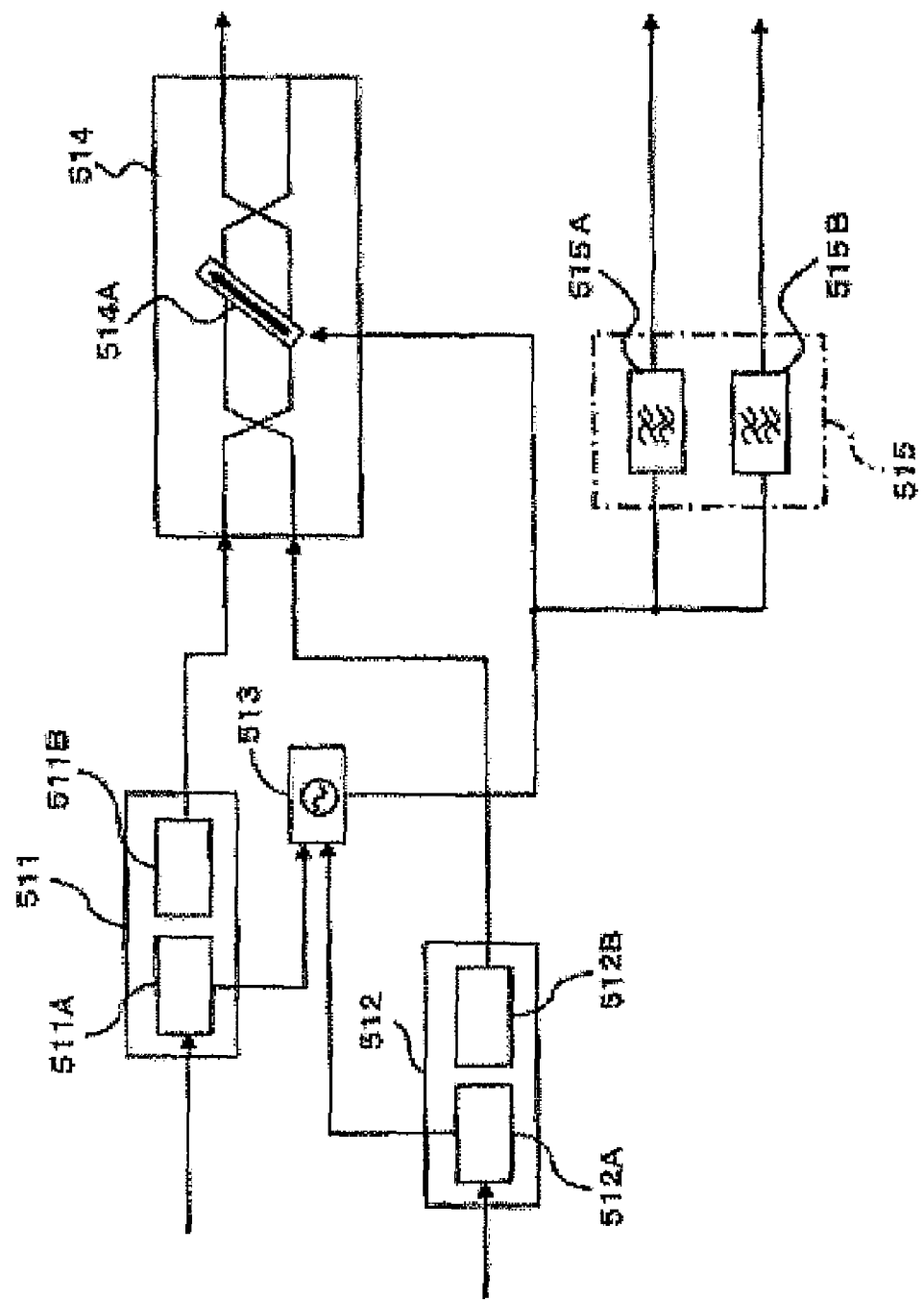
FIG. 3 is a block diagram illustrating an essential part of a transmission apparatus in the present embodiment.

FIG. 3 is a block diagram illustrating the frequency detecting section 515 in detail together with the wavelength selective optical switch 514 by the above-described optical switch controlling section 513. Here, the wavelength selective optical switch 514 includes a SAW creating section 514A that creates a surface acoustic wave (SAW; Surface Acoustic Wave) in correspondence with the frequency of the controlling frequency signal that is supplied as a controlling signal, and is configured as an acousto-optical wavelength filter capable of selectively changing the wavelength of the optical signal outputted from the emitting-side with the above-described controlling frequency signal.

In other words, the optical switch controlling section 513 receives an input of LOS signal, LOF signal, and SD signal as supervision control information from the above-described O/E converting sections 511A, 512A, and creates the controlling frequency signal fa or fb to the wavelength selective optical switch 514 serving as the acousto-optical wavelength filter on the basis of the protection control using this supervision control information.

This allows that, when the controlling signal from the optical switch controlling section 513 has a frequency of fa, the wavelength selective optical switch 514 can selectively output the optical signal (wavelength $\lambda a$) coming from the signal processing section 511, whereas when the controlling frequency signal from the optical switch controlling section 513 has a frequency of fb, the wavelength selective optical switch 514 can selectively output the optical signal (wavelength $\lambda b$) coming from the signal processing section 512.

Also, the frequency detecting section 515 detects the frequency of the controlling frequency signal that the above-described optical switch controlling section 513 supplies to the wavelength selective optical switch 514, and can be constituted, for example, of a bandpass filter corresponding to the frequency kind used as the controlling frequency signal.

Specifically, as illustrated in FIG. 3, the frequency detecting section 515 includes two bandpass filters 515A, 515B that receive a parallel input of the controlling frequency signal supplied from the optical switch controlling section 513 to the wavelength selective optical switch 514 and extract a frequency component of the respective frequencies fa, fb.

In other words, by using the respective output signal levels from these bandpass filters 515A, 515B, when the frequency component extracted in the bandpass filter 515A is comparatively large, it is detected that the optical switch controlling section 513 outputs the controlling frequency signal of frequency fa, whereas when the frequency component extracted in the bandpass filter 515B is comparatively large, it is detected that the optical switch controlling section 513 outputs the controlling frequency signal of frequency fb.

Further, the monitor section 516 monitors the optical signals created in the respective E/O converting sections 511B, 512B and, in this case, is constituted as a cut-off state detecting circuit that detects a cut-off state of each E/O converting section 511B, 512B by receiving an input of the electric signal $I_B$ supplied to the LD (See reference number 531 in FIG. 2) in the E/O converting sections 511B, 512B of the signal processing sections 511, 512 and the received light signal from the light-receiving element (See reference number 535 in FIG. 2).

Path selection for protection control in a transmission apparatus according to one embodiment of the present invention by the above-described configuration is carried out as follows.

Namely, in the WDM transmitting apparatus 100, wavelength multiplex signals (frequency components f1 to fn) are transmitted redundantly through the two paths 301, 302, whereas in the WDM receiving apparatus 500, these redundantly transmitted optical signals are received by the wavelength separating sections 501, 502, and any one of the optical signals transmitted through the paths 301, 302 is selected for the optical signal of each wavelength component by protection processing in the receiving-side protection processing sections 510-1 to 510-n.

At this time, the receiving-side protection processing sections 510-1 to 510-n receive an input of the optical signals redundantly transmitted with the same wavelength through the two optical signal transmission paths 301, 302 from the WDM transmitting apparatus 100, and outputs them respectively as optical signals having wavelengths that are different from each other to the wavelength selective optical switch.

For example, in the receiving-side protection processing section 510-1, the E/O converting sections 511B, 512B of the signal processing sections 511, 512 receive an input of the optical signals that have been redundantly transmitted with the same wavelength f1 through the two optical signal transmission paths 301, 302 from the WDM transmitting apparatus 100, and output them as optical signals having wavelengths $\lambda a$, $\lambda b$ that are different from each other to the wavelength selective optical switch 514.

Also, the optical switch controlling section 513 controls the wavelength selective optical switch 514 with the controlling frequency signal for outputting the optical signal that is transmitted through the optical signal transmission path selected by the protection control. This allows that the optical signal outputted from the wavelength selective optical switch 514 can be received as an optical signal coming from the selected path.

At this time, the frequency detecting section 515 extracts frequency information of the controlling frequency signal that is outputted to the wavelength selective optical switch 514 from the optical switch controlling section 513, so that the wavelength of the optical signal outputted from the relevant wavelength selective optical switch 514 can be specified. Therefore, by simply detecting the frequency of the controlling signal for protection control, the selected path can be grasped at all times without monitoring the signal from the main signal system.

Also, the monitor section 516 stably monitors the state of the LD in the E/O converting sections 511B, 512B of both the active and the standby systems through monitoring the state of the LD in the E/O converting sections 511B, 512B that are always in an operating state.

Here, it is preferable to set the optical wavelengths created in the LD of the above-described E/O converting sections 511B, 512B so that the wavelengths of the optical signals outputted in the wavelength selective optical switch of each of the receiving-side protection processing sections 510-1 to 510-n will be different from each other.

In this manner, one embodiment of the present invention provides an advantage in that, since the E/O converting sections 511B, 512B, the wavelength selective optical switch 514, and the optical switch controlling section 513 are included, the path selection direction by the wavelength selective optical switch 514 can be monitored at all times, and also the normality of the standby system which is a non-selected optical path can be supervised at all times.

Here, in the above-described present embodiment describes in detail a case in which any one of the optical signal transmission paths is selected by protection control in a wavelength multiplexing optical communication system; however, it goes without saying that the present invention can also be applied to a case in which any one of multiplexed paths is selected by protection control in a system other than the wavelength multiplexing system.

Further, in the above-described present embodiment, a configuration having doubled paths is applied as a mode of protection control; however, the present invention is not limited to this, so that multiplexed paths more than two paths may be set as well.

Also, according to the present invention, the transmission apparatus as the WDM receiving apparatus 500 in the above-described present embodiment can be constructed by omitting the frequency detecting section 515 and the monitor section 516 in accordance with the needs.

Here, irrespective of the above-described embodiment, various modifications can be made and implemented within a range that does not depart from the gist of the present invention.

Here, when the embodiments of the present invention are disclosed, they can be manufactured by those skilled in the art.

INDUSTRIAL APPLICABILITY

As described above, the transmission apparatus and the path selection method of a transmission apparatus of the present invention are useful in receiving an optical signal by selecting any one of a plurality of provided optical signal transmission paths through protection control, and are suitable particularly for protection communication in a WDM wavelength multiplexing optical communication system.

What is claimed is:

1. A transmission apparatus that receives an optical signal by selecting any one of a plurality of provided optical signal transmission paths through protection control, comprising:
a plurality of optical signal outputting sections that output the optical signals transmitted through said plurality of optical signal transmission paths respectively as optical signals having wavelengths that are different from each other;
a wavelength selective optical switch capable of selectively outputting light of a wavelength corresponding to any one of the optical signals coming from the plurality of optical signal outputting sections on the basis of the frequency of a controlling frequency signal;
an optical switch controlling section that supplies said controlling frequency signal to the wavelength selective optical switch so as to output the optical signal coming from the optical signal transmission path side that is selected by said protection control among the optical signals coming from the optical signal outputting sections; and
a frequency detecting section that detects the frequency of said controlling frequency signal.

2. The transmission apparatus according to claim 1, wherein the frequency detecting section is constructed to include band pass filters capable of respectively detecting controlling frequency signals corresponding to said selectively outputtable optical signals.

3. The transmission apparatus according to claim 1, wherein the optical switch controlling section is constructed to supply said controlling frequency signal to the wavelength selective optical switch by the protection control based on the respective optical signals that have been transmitted through said plurality of optical signal transmission paths.

4. The transmission apparatus according to claim 1, wherein the wavelength selective optical switch is constructed with an acousto-optical wavelength filter.

5. A transmission apparatus that receives an optical signal by selecting any one of a plurality of provided optical signal transmission paths through protection control, comprising:
a plurality of optical signal outputting sections that output the optical signals transmitted through said plurality of optical signal transmission paths respectively as optical signals having wavelengths that are different from each other;
a wavelength selective optical switch capable of selectively outputting light of a wavelength corresponding to any one of the optical signals coming from the plurality of optical signal outputting sections on the basis of the frequency of a controlling frequency signal;
an optical switch controlling section that supplies said controlling frequency signal to the wavelength selective optical switch so as to output the optical signal coming from the optical signal transmission path side that is selected by said protection control among the optical signals coming from the optical signal outputting sections;
a frequency detecting section that detects the frequency of said controlling frequency signal; and
a monitoring section that monitors the respective optical signals in the optical signal outputting sections.

6. The transmission apparatus according to claim 5, wherein the frequency detecting section is constructed to include band pass filters capable of respectively detecting controlling frequency signals corresponding to said selectively outputtable optical signals.

7. The transmission apparatus according to claim 5, wherein each of the optical signal outputting sections includes a light-emitting element capable of emitting light of a wavelength that is different from each other, a light-emitting element driving section that drives the light-emitting element so as output said optical signal, and a light-receiving element that receives back light of the light-emitting element, and
the monitoring section is constructed as a cut-off state detecting circuit that detects a cut-off state of each optical signal outputting section on the basis of the received light signal coming from the light-receiving element of each optical signal outputting section.

8. The transmission apparatus according to claim 5, wherein the optical switch controlling section is constructed to supply said controlling frequency signal to the wavelength selective optical switch by the protection control based on the respective optical signals that have been transmitted through said plurality of optical signal transmission paths.

9. The transmission apparatus according to claim 5, wherein the wavelength selective optical switch is constructed with an acousto-optical wavelength filter.

10. A transmission apparatus that receives an optical signal by selecting any one of a plurality of provided optical signal transmission paths through protection control, comprising:
a plurality of optical signal outputting sections that output the optical signals transmitted through said plurality of optical signal transmission paths respectively as optical signals having wavelengths that are different from each other;
a wavelength selective optical switch capable of selectively outputting light of a wavelength corresponding to any one of the optical signals coming from the plurality of optical signal outputting sections on the basis of the frequency of a controlling frequency signal;
an optical switch controlling section that supplies said controlling frequency signal to the wavelength selective optical switch so as to output the optical signal coming from the optical signal transmission path side that is selected by said protection control among the optical signals coming from the optical signal outputting sections; and
a monitoring section that monitors the respective optical signals outputted from the optical signal outputting sections, wherein each of the optical signal outputting sections includes a light-emitting element capable of emitting light of a wavelength that is different from each other, a light-emitting element driving section that drives the light-emitting element so as to output said optical signal, and a light-receiving element that receives back light of the light-emitting element, and the monitoring section is constructed as a cut-off state detecting circuit that detects a cut-off state of each optical signal outputting section on the basis of the received light signal coming from the light-receiving element of each optical signal creating section.

11. The transmission apparatus according to claim 10, wherein the optical switch controlling section is constructed to supply said controlling frequency signal to the wavelength selective optical switch by the protection control based on the respective optical signals that have been transmitted through said plurality of optical signal transmission paths.

12. The transmission apparatus according to claim 10, wherein the wavelength selective optical switch is constructed with an acousto-optical wavelength filter.

13. A path selection method of a transmission apparatus in which a plurality of optical signal transmission paths are provided between a first transmission apparatus and a second transmission apparatus, and any one of said plurality of optical signal transmission paths is selected by protection control in the second transmission apparatus, comprising steps of:

inputting, in the second transmission apparatus, optical signals that have been transmitted redundantly with the same wavelength through the plurality of optical signal transmission paths from said first transmission apparatus;

converting the wavelength of each inputted optical signal into wavelength different from each other, respectively;

outputting each wavelength-converted optical signal to a wavelength selective optical switch;

selectively outputting, by the wavelength selective optical switch, light of a wavelength corresponding to any one of the optical signals coming from the plurality of optical signal outputting sections on the basis of a frequency of a controlling frequency signal;

receiving an optical signal outputted from the wavelength selective optical switch as an optical signal from the selected path by controlling the wavelength selective optical switch with a controlling frequency signal for outputting the optical signal transmitted through the optical signal transmission path that is selected by said protection control; and detecting the frequency of the controlling frequency signal.

* * * * *